US009250899B2

(12) United States Patent
Gschwind

(10) Patent No.: US 9,250,899 B2
(45) Date of Patent: Feb. 2, 2016

(54) METHOD AND APPARATUS FOR SPATIAL REGISTER PARTITIONING WITH A MULTI-BIT CELL REGISTER FILE

(75) Inventor: Michael Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1190 days.

(21) Appl. No.: 11/762,156

(22) Filed: Jun. 13, 2007

(65) Prior Publication Data
US 2008/0313424 A1    Dec. 18, 2008

(51) Int. Cl.
*G06F 9/30*        (2006.01)
*G06F 9/38*        (2006.01)

(52) U.S. Cl.
CPC ........ *G06F 9/30036* (2013.01); *G06F 9/30109* (2013.01); *G06F 9/30123* (2013.01); *G06F 9/3851* (2013.01); *G06F 9/3885* (2013.01)

(58) Field of Classification Search
CPC ............ G06F 9/30105; G06F 9/30109; G06F 9/30112
See application file for complete search history.

(56) References Cited

U.S. PATENT DOCUMENTS

| 4,276,488 | A   |   | 6/1981  | Benedict et al. |
|-----------|-----|---|---------|-----------------|
| 4,879,680 | A   |   | 11/1989 | Luckett et al.  |
| 5,261,113 | A   | * | 11/1993 | Jouppi ............................... 712/8 |
| 5,345,588 | A   |   | 9/1994  | Greenwood et al. |
| 5,778,243 | A   |   | 7/1998  | Aipperspach et al. |
| 5,813,037 | A   |   | 9/1998  | Martell et al. |
| 6,038,166 | A   |   | 3/2000  | Wong |
| 6,378,065 | B1  |   | 4/2002  | Arnold et al. |
| 6,462,986 | B1  |   | 10/2002 | Khan |
| 6,530,011 | B1  | * | 3/2003  | Choquette ......................... 712/3 |
| 6,571,328 | B2  | * | 5/2003  | Liao et al. ....................... 712/35 |
| 6,629,236 | B1  |   | 9/2003  | Aipperspach et al. |
| 6,657,913 | B2  |   | 12/2003 | Abedifard et al. |
| 7,085,153 | B2  |   | 8/2006  | Ferrant et al. |
| 2008/0082893 | A1 | * | 4/2008 | Wang ............................ 714/758 |

OTHER PUBLICATIONS

Eichenberger et al., "Optimizing Compiler for the Cell Processor", Proceedings of the 14th International Conference on Parallel Architectures and Compilation Techniques, IEEE, 2005, pp. 161-172.*

(Continued)

*Primary Examiner* — Benjamin Geib
(74) *Attorney, Agent, or Firm* — Tutunjian & Bitetto, P.C.; Jennifer R. Davis

(57) ABSTRACT

There is provided a multi-bit storage cell for a register file. The storage cell includes a first set of storage elements for a vector slice. Each storage element respectively corresponds to a particular one of a plurality of thread sets for the vector slice. The storage cell includes a second set of storage elements for a scalar slice. Each storage element in the second set respectively corresponds to a particular one of at least one thread set for the scalar slice. The storage cell includes at least one selection circuit for selecting, for an instruction issued by a thread, a particular one of the storage elements from any of the first set and the second set based upon the instruction being a vector instruction or a scalar instruction and based upon a corresponding set from among the pluralities of thread sets to which the thread belongs.

20 Claims, 7 Drawing Sheets

(56) References Cited

OTHER PUBLICATIONS

Asano et al., "Low-Power Design Approach of 1FO4 256-Kbyte Embedded SRAM for the Synergistic Processor Element of a Cell Processor", IEEE Micro, vol. 25, iss. 5, Sep.-Oct. 2005, pp. 30-38.*
Gschwind et al., "Synergistic Processing in Cell's Multicore Architecture", IEEE Micro, Mar.-Apr. 2006, pp. 10-24.*
Borkenhagen et al., "A Multithreaded PowerPC Processor for Commercial Servers", IBM J Res. Develop, vol. 44, No. 6 Nov. 2000; pp. 885-898.
B. Shinharoy et al., "POWER% System Microarchitecture", IBM J Res & Dev., vol. 49, No. 4/5, Jul./Sep. 2005; pp. 505-521.
T. N. Butt et al., Organization and Implementation of Register-Renaming Mapper for Out-of-Order IBM POWER4 Processors; IBM J Res. & Dev., vol. 49, No. 1, Jan. 2005; pp. 167-188.
Gschwind, "Register Map Unit Supporting Map of Multiple Register Specifier Classes", Unpublished US Application filed Jan. 3, 2007, U.S. Appl. No. 11/619,248.

* cited by examiner

METHOD AND APPARATUS FOR SPATIAL REGISTER PARTITIONING WITH A MULTI-BIT CELL REGISTER FILE

BACKGROUND

1. Technical Field

The present principles generally relate to register files, and more particularly, to methods and apparatus for spatial register partitioning in a multi-bit cell register file. The methods and apparatus balance timing and area between register file slices for a register file supporting scalar and vector execution.

2. Description of the Related Art

Modern microprocessor systems derive significant efficiency from using data-parallel single instruction multiple data (SIMD) execution, particularly for data-intensive floating point computations. In addition to data-parallel SIMD computation, scalar computation is necessary for code that is not data parallel. In modern Instruction Set Architectures (ISAs), such as the Cell SPE, scalar computation can be executed from a SIMD register file.

In ISAs with legacy support, separate scalar register files are necessary. To reduce the overhead of having to support scalar and SIMD computation, it is desirable to share data paths. Turning to FIG. 1, an exemplary register architecture having two separate register files, one for storing scalar data and the other for storing vector data, thus requiring the different types of data to be stored in different (separate) register files, is indicated generally by the reference numeral 100. The exemplary architecture includes the scalar register file 110 and the vector register file 120, as noted above, as well as a multiplexer 130, and FMA units 140. This prior art approach undesirably utilizes routing resources and multiplexers (such as multiplexer 130) in order to select from multiple data sources. Moreover, this prior art approach undesirably has a higher fan-out to drive data into one of the multiple data destinations.

To reduce the chip area used for such implementations, it would be desirable to implement a single register file to store data for both the scalar and SIMD register file.

In one prior art implementation, a narrow register file is implemented, and wide architected registers are accomplished by allocating multiple scalar physical registers. However, this prior art implementation results in either low performance, when each slice is operated upon in sequence, or high area cost, when data for multiple slices are read in parallel by increasing the number of read ports.

SUMMARY

The present principles are directed to a method and apparatus for spatial register partitioning with a multi-bit cell register file.

According to an aspect of the present principles, there is provided a multi-bit storage cell for a register file. The multi-bit storage cell includes a first set of storage elements for a vector slice. Each of the storage elements in the first set respectively corresponds to a particular one of a plurality of thread sets for the vector slice. The multi-bit storage cell includes a second set of storage elements for a scalar slice. Each of the storage elements in the second set respectively corresponds to a particular one of at least one thread set for the scalar slice. The multi-bit storage cell includes at least one selection circuit, connected to the first set and the second set of storage elements, for selecting, for a given instruction issued by a given thread, a particular one of the storage elements from any of the first set and the second set of storage elements based upon the given instruction being a vector instruction or a scalar instruction and based upon a corresponding set from among the pluralities of thread sets to which the given thread belongs.

According to another aspect of the present principles, there is provided a register file with multi-bit bit cells for storing wide data and narrow data. The register file includes a first multi-bit storage cell having bit cells for storing a portion of the wide data for each of a plurality of thread sets, and having at least one of the bit cells for storing a portion of the narrow data corresponding to at least one of the plurality of thread sets. The register file includes a second multi-bit storage cell having bit cells for storing another portion of the wide data for each of the plurality of thread sets, and having at least one of the bit cells for storing the portion of the narrow data stored by the first storage cell but corresponding to at least one other one of the plurality of thread sets. Each of the plurality of thread sets includes one or more member threads.

According to yet another aspect of the present principles, there is provided a microprocessor adapted to the execution of instructions operating on narrow data and wide data and corresponding to a plurality of thread sets. The microprocessor includes at least one first multi-bit storage element having a plurality of bit cells. At least two of the plurality of bit cells are for storing a portion of the wide data for each of the plurality of thread sets. At least one of the plurality of bit cells is for storing a portion of the narrow data corresponding to at least one of the plurality of thread sets. The microprocessor includes at least one second multi-bit storage element having a plurality of bit cells. At least two of the plurality of bit cells of the at least one second multi-bit storage element are for storing another portion of the wide data for each of the plurality of thread sets. At least one of the plurality of bit cells of the at least one second multi-bit storage element is for storing a same portion of the narrow data for at least another one of the plurality of thread sets as that stored by the at least one of the plurality of bit cells of the at least one first multi-bit storage element. The microprocessor includes a plurality of data paths corresponding to data slices adapted to operate on the wide data to generate a wide data result. A first subset of the plurality of data paths operate on the narrow data corresponding to a first one of the plurality of thread sets. A second subset of the plurality of data paths operate on the narrow data corresponding to a second one of the plurality of thread sets. Each of the plurality of thread sets includes one or more member threads.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
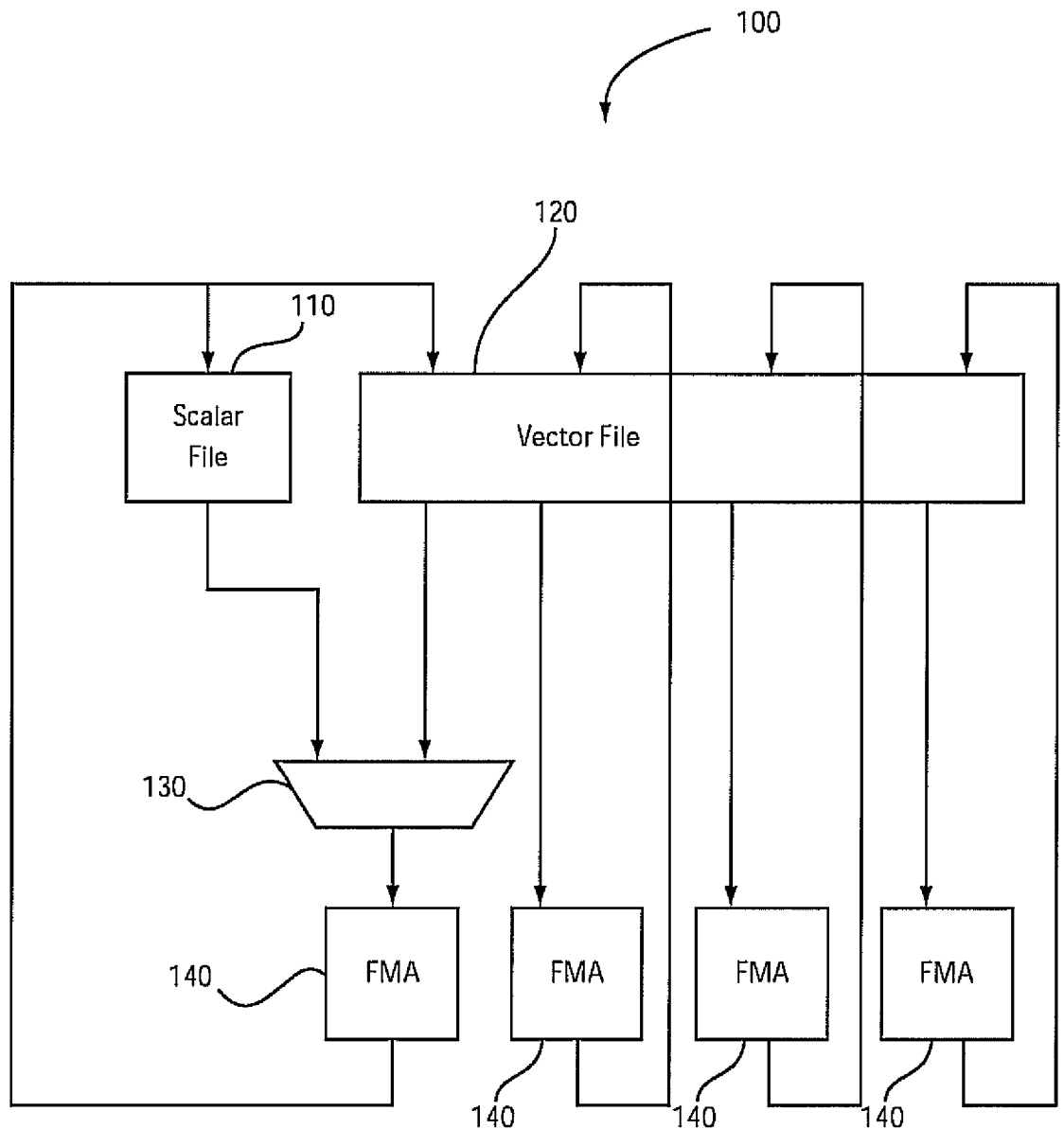
FIG. 1 shows two register files, one for scalar data and the other for vector data, in accordance with the prior art.

The present principles are directed to methods and apparatus for spatial register partitioning with a multi-bit cell register file.

Advantageously, the present principles provide register files that can store both scalar data and vector data, and which utilize a small chip area while supporting high performance execution. Moreover, the present principles provide register file operation methods, and register file design methods.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment (which includes but is not limited to firmware, resident software, microcode, and so forth) or an embodiment including both hardware and software elements. In a preferred embodiment, the present invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described herein may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the phrase "thread set" is used herein to denote one or more threads having some common association, such that a thread set may include a single thread or may include a thread group that, in turn, includes multiple threads.

It is to be appreciated that while the present principles are directed to register files that include a group of registers, for the sake of simplicity and illustration, embodiments of the present principles are shown and described with respect to a subset of bit cells from one register.

Thus, each register includes a group of bit cells, and there may be multiple such registers in a register file. As used herein, slice 0, slice 1, slice 2, . . . , slice n, denote that each of the bit cells represent a group of bits inside a particular slice or slot.

While some embodiments of the present principles described herein are so described with respect to four slices, those of ordinary skill in this and related arts will understand that the use of four slices is exemplary, and vectors with more than four slices or less than four slices (but having at least two slices) may also be used.

In accordance with an embodiment of the present principles, a register file includes data bits corresponding to wide data being processed in the processor, wherein the wide datum has m bits. In accordance with an aspect of this embodiment, a register file also includes data bits corresponding to narrow data being processed in the processor, wherein the narrow datum has n bits, and n<m, i.e., the number of bits in the narrow data is less than the number of bits in the wide data.

In a preferred embodiment, the number of bits in wide data includes at least twice as many bits as the narrow data, i.e., n<=2*m. In one exemplary embodiment, the wide data includes a 4 element vector, e.g., having 256 bits and including four 64 bit double precision floating point numbers, and the short data corresponds to a scalar data element including a single 64 bit double precision floating point number. In another embodiment, the wide data includes a 4 element vector (e.g., 256 bits representing four 64 bit double precision floating point numbers), and the narrow data corresponds to a short vector of 2 elements (e.g., 128 bits representing two 64 bit double precision floating point numbers). Of course, the preceding examples of wide and narrow data are merely illustrative, and others implementations of the same are possible, as readily contemplated by one of ordinary skill in this and related arts, while maintaining the spirit of the present principles.

As noted above, the present invention is directed to implementing register files to store scalar data and vector data using multi-bit storage cells in a register file.

In accordance with an optimized register file, multiple bits are stored in a single bit cell. The multiple bits may correspond to, for example, a plurality of thread sets (hereinafter "thread sets"). In such an implementation, it would be advantageous to implement a register file having bit cells for each thread set of a vector file, and for each thread set of a scalar floating point register file.

In another embodiment, multiple threads are supported without support for thread sets.

Figure 2:
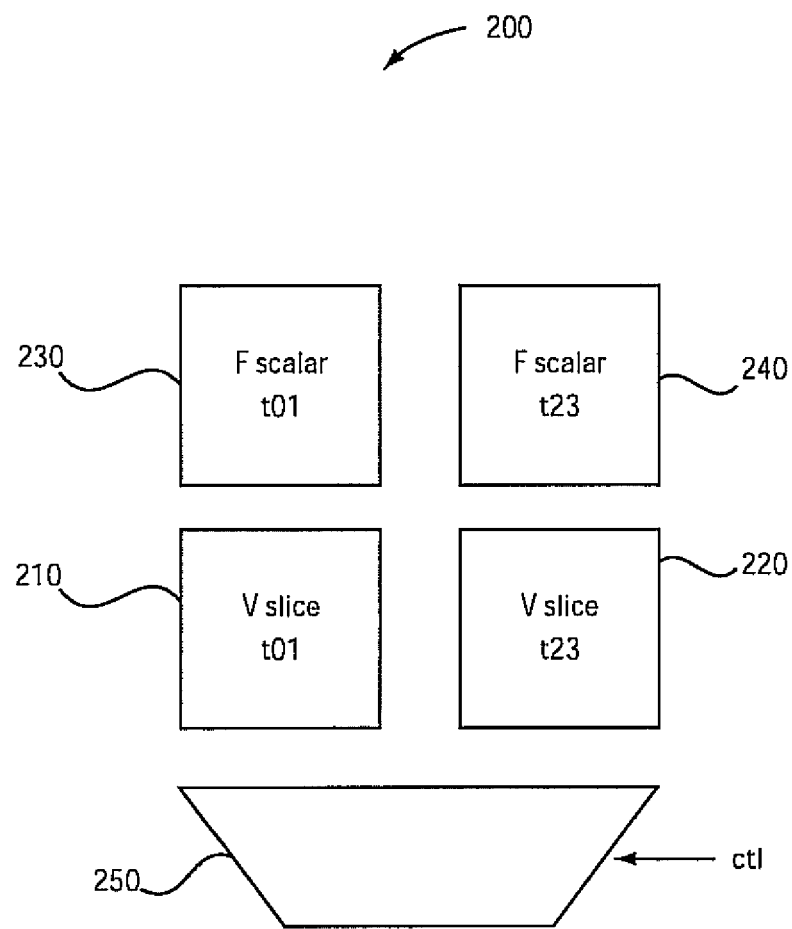
FIG. 2 shows an exemplary multi-bit cell for a register file, in accordance with an embodiment of the present principles.

Turning to FIG. 2, an exemplary multi-bit cell for a register file encompassing four storage elements, in accordance with an embodiment of the present principles, is indicated generally by the reference numeral 200. The four storage elements, designated by the reference numerals 210, 220, 230, and 240 correspond to a first thread set and a second thread set for a vector slice, and a first thread set and a second thread set for storing scalar values.

"t01" represents a data storage element for a first thread set (that includes exemplary threads 0 and 1), and "t23" represents an exemplary second thread set (that includes exemplary threads 2 and 3).

The storage cells 210, 220, 230, and 240 are each operatively coupled to at least one first level multiplexing device 250 to select a storage cell based on the nature of the instruction (i.e., whether an instruction is a scalar instruction or a vector instruction), and whether the instruction is issued by a thread in a first thread set (e.g., encompassing threads 0 and 1) or in a second thread set (e.g., encompassing threads 2 and 3).

In accordance with one embodiment, this cell is used to implement a portion of a floating point/scalar register file for storing scalar data and a first vector slice.

Figure 3:
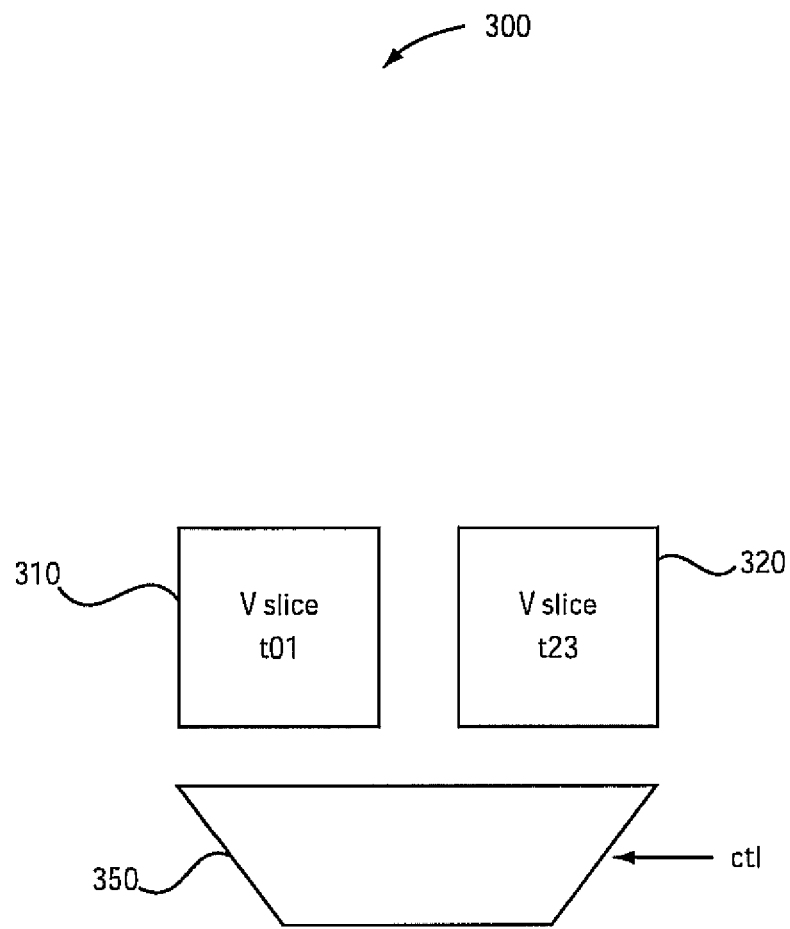
FIG. 3 shows an exemplary multi-bit register storage element for storing data corresponding to a first or a second thread set, in accordance with an embodiment of the present principles.

Turning to FIG. 3, an exemplary multi-bit register storage element for storing data corresponding to a first or a second thread set, in accordance with an embodiment of the present principles, is indicated generally by the reference numeral 300. The multi-bit storage element 300 includes two storage elements, designated by the reference numerals 310 and 320. The storage cells 310 and 320 are each operatively coupled to at least one first level multiplexing device 350.

In accordance with one embodiment, this multi-bit storage element 300 is used to implement at least one additional storage cell of a register file.

While one or more embodiments are described herein with respect to thread sets, it is to be appreciated that the present principles are not limited solely to implementations involving thread sets, and that the present principles may be practiced with specific storage cells corresponding to threads rather than thread sets, while maintaining the spirit of the present principles.

Figure 4:
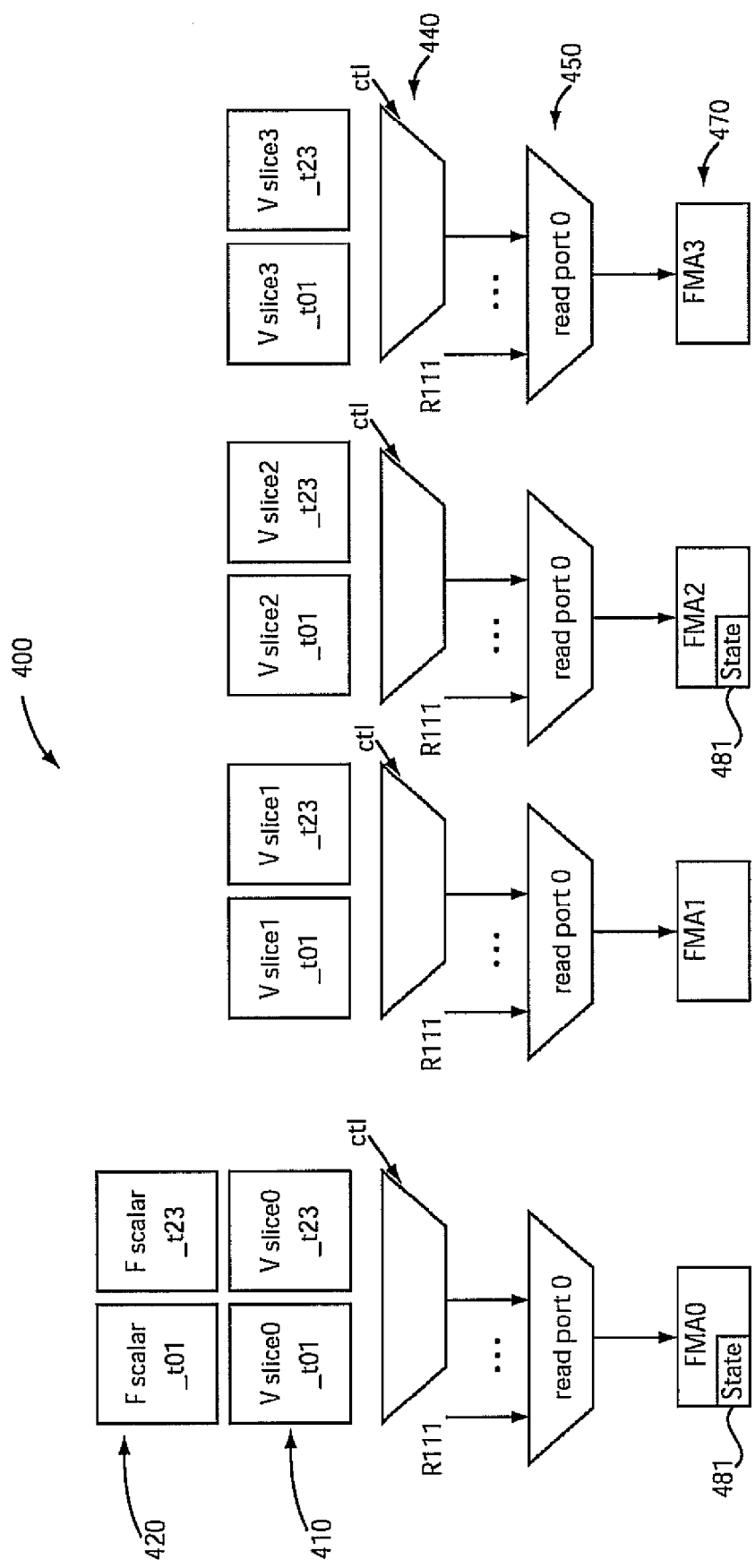
FIG. 4 shows an exemplary register file that includes 4 slices, in accordance with an embodiment of the present principles.

Turning to FIG. 4, an exemplary register file that includes 4 slices, in accordance with an embodiment of the present principles, is indicated generally by the reference numeral 400. The register file 400 stores scalar data and vector data in a first slice in accordance with the cell of FIG. 2 which includes but is not limited to firmware, resident software, microcode, and so forth, and vector data in accordance with the cell of FIG. 3.

The embodiment shown in FIG. 4 offers significant advantages over the prior art register architecture of FIG. 1 by simplifying the connectivity, and reducing the number of data sources and sinks. Instead of data routing at the unit level, data distribution and selection can be carefully planned and engineered as part of the register file design process.

In accordance with the embodiment shown in FIG. 4, each multi-bit cell has storage elements 410 corresponding to storing a data slice from the vector register file corresponding to a first and a second thread set. In addition, a first slice of vector data also includes storage elements 520 for storing scalar data elements for a first thread set (or thread) and a second thread set (or thread). Execution data paths are collectively denoted by the reference numeral 470. Individual ones of the execution data paths 470 are denoted by "FMA" followed by an integer, where FMA denotes fused multiply add data path. State 481 may be associated with at least some of the individual data paths 470. Multiplexers for selecting a particular one on or more of the storage elements 410 and 420 are indicated generally by the reference numeral 440. Multiplexers for selecting a particular read port, such as read port 0, are indicated generally by the reference numeral 450.

However, as shown in FIG. 4, in accordance with this multi-bit cell embodiment for a register file, a portion of the register file includes significantly more cells and is, thus, larger and slower. As a result, the design of a vector/scalar unit will be dominated by the timing of the slow register file slice. In addition, complications for floor planning will arise due to the pronounced asymmetry of the register file slices.

Thus, a more uniform distribution of area and routing resources across the slices would be preferable.

Figure 5:
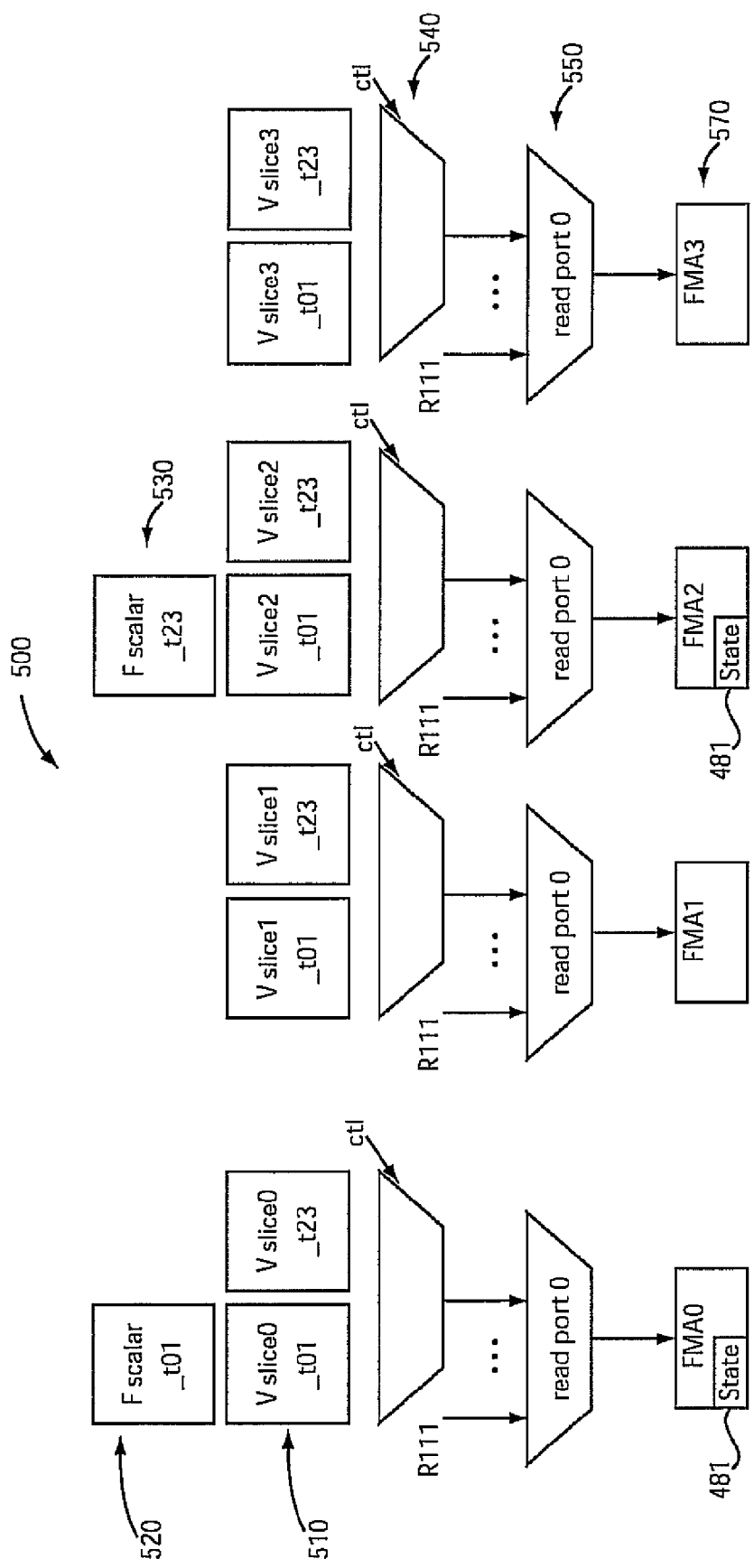
FIG. 5 shows an exemplary register file using spatial partitioning to balance register file cell sizes, in accordance with an embodiment of the present principles.

Turning to FIG. 5, an exemplary register file using spatial partitioning to balance register file cell sizes, in accordance with an embodiment of the present principles, is indicated generally by the reference numeral 500. The register file 500 is balanced by balancing the number of storage cells.

In accordance with the embodiment shown in FIG. 5, each multi-bit cell has storage elements 510 corresponding to storing a data slice from the vector register file corresponding to a first and a second thread set. In addition, a first slice of vector data also includes storage elements 520 for storing scalar data elements for a first thread set (or thread), and at least one second slice includes storage elements 530 for storing scalar data elements for a second thread set (or thread). Execution data paths are collectively denoted by the reference numeral 570. Individual ones of the execution data paths 570 are denoted by "FMA" followed by an integer, where FMA denotes fused multiply add data path. State 581 may be associated with at least some of the individual data paths 570. Multiplexers for selecting a particular one on or more of the storage elements 510, 520, and 530 are indicated generally by the reference numeral 540. Multiplexers for selecting a particular read port, such as read port 0, are indicated generally by the reference numeral 550.

In accordance with the embodiment shown in FIG. 5, storage cells associated with a first thread set (or thread) for scalar execution are operatively coupled to at least one first execution data path, designated FMA0 in this example, and storage cells associated with a second thread set are operatively coupled to at least one second execution data path, designated FMA2 in this example.

In accordance with this embodiment, instructions associated with the first thread set will execute on the first data paths, and instructions associated with the second thread set will execute on the second data paths.

Those skilled in this and related arts will understand that when a state specific to scalar execution is stored within a data path, the state for each scalar unit is either preferably maintained in the data path operatively coupled to the slice that includes the scalar operands, or such state is distributed and made available to the data path when a scalar instruction is issued to the data path coupled to the slice storing the scalar operands.

Figure 6:
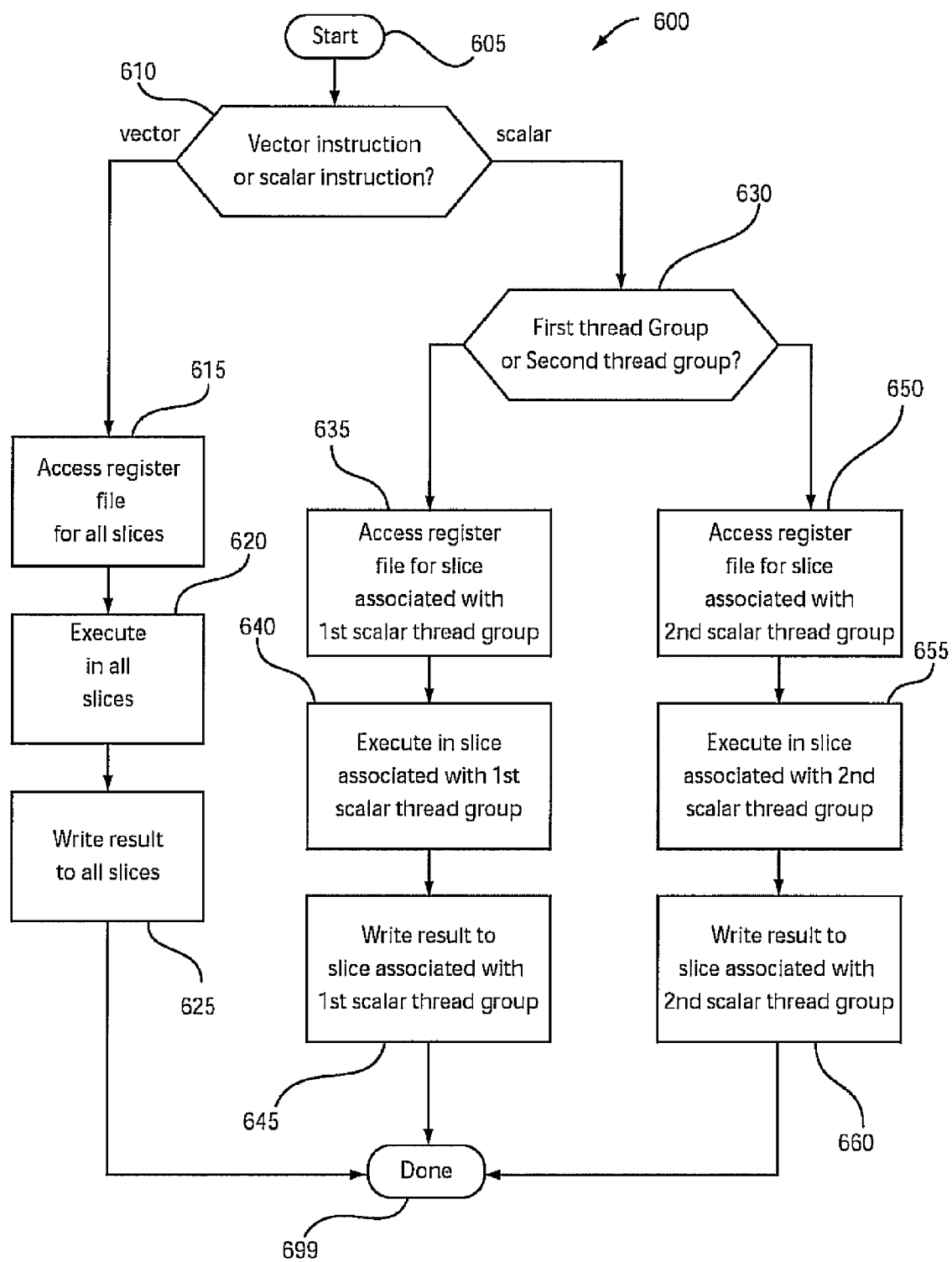
FIG. 6 shows an exemplary execution method associated with a multi-bit cell register file, in accordance with an embodiment of the present principles.

Turning to FIG. 6, an exemplary execution method for accessing a register file in accordance with an embodiment of the present principles is indicated generally by the reference numeral 600.

The method includes a start block 605 that passes control to a decision block 610. The decision block tests an instruction to determine whether the instruction is a vector instruction or a scalar instruction.

If the instruction is a vector instruction, the control is passed to a function block 615. Otherwise, if the instruction is a scalar instruction, then control is passed to a decision block 630.

The function block 615 accesses the register file for all slices, and passes control to a function block 620. The function block 620 executes in all slices, and passes control to a function block 625. The function block 625 writes the results to all slices, and passes control to an end block 699.

The decision block 630 determines whether the first thread set or the second thread set is invoked by the instruction. If the first thread set is invoked by the instruction, then control is passed to a function block 635. Otherwise, control is passed to a function block 650.

The function block 635 accesses the register file for the slice associated with the first scalar thread set, and passes control to a function block 640. The function block 640 executes the instruction in the slice associated with the first scalar thread set, and passes control to a function block 645. The function block 645 writes the results to a slice associated with the first scalar thread set, and passes control to the end block 699.

The function block 650 accesses the register file for the slice associated with the second scalar thread set, and passes control to a function block 655. The function block 655 executes the instruction in the slice associated with the second scalar thread set, and passes control to a function block 660. The function block 660 writes the results to the slice associated with the second scalar thread set, and passes control to the end block 699.

Figure 7:
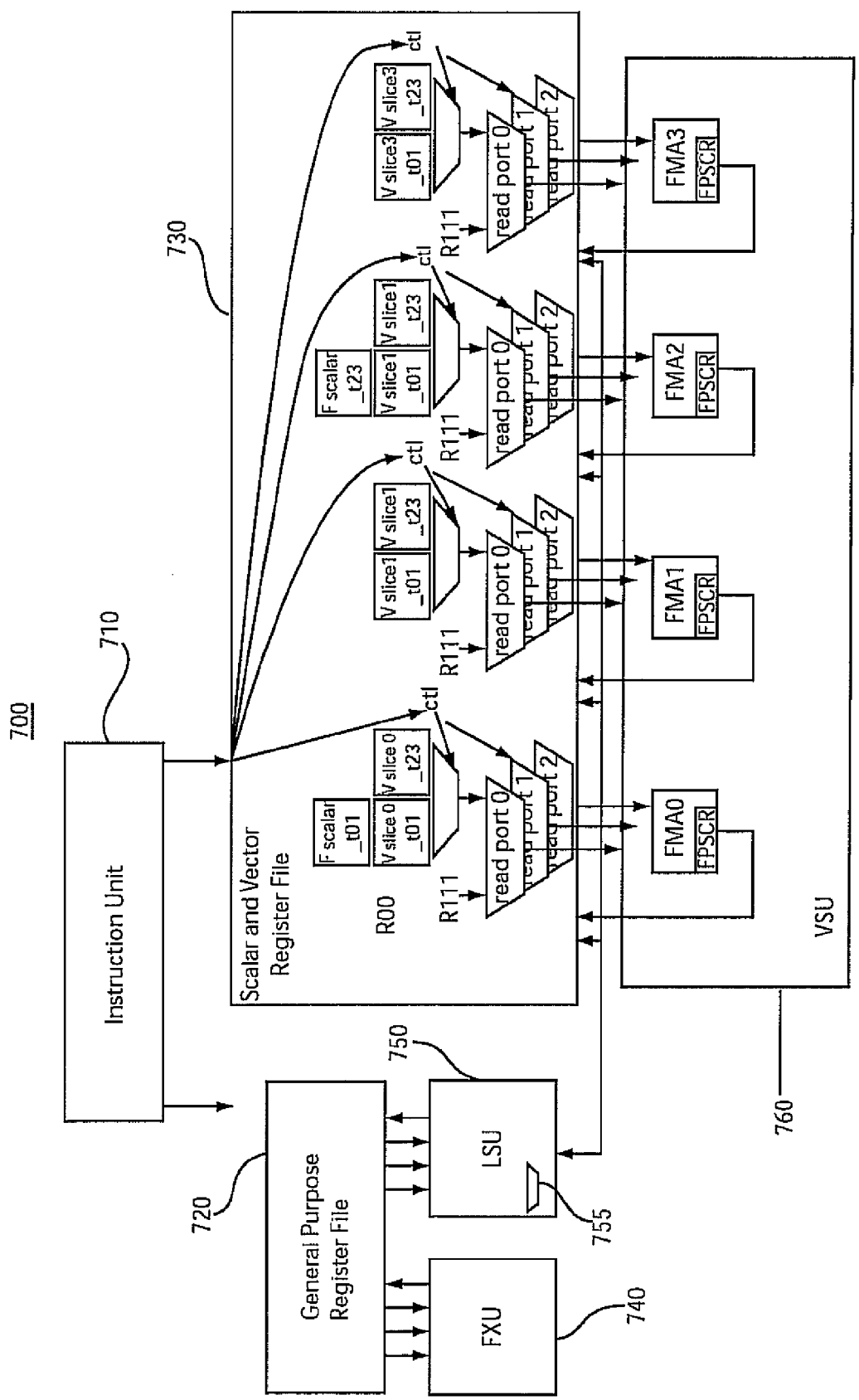
FIG. 7 shows an exemplary microprocessor 700 using spatial partitioning of narrow data in a register file storing wide and narrow data in a microprocessor, in accordance with an embodiment of the present principles.

Referring now to FIG. 7, there is shown an exemplary microprocessor 700 employing spatial register partitioning with a multi-bit cell register file, in accordance with an embodiment of the present principles. The multi-bit register file is capable of storing wide and narrow data, wherein the narrow data corresponds to scalar floating point data and the wide data corresponds to SIMD vector data Instructions are fetched, decoded and issued by an instruction unit 710. Instruction unit 710 is operatively coupled to a memory hierarchy (not shown) for supplying instructions.

Instructions are selected for issue by issue and/or dispatch logic, for example, included in instruction unit 710, to select an instruction to be executed in accordance with data availability. In some embodiments, instructions must be issued in-order, while other embodiments support instruction issue out-of-order with respect to the instruction program order.

Instructions are issued to at least one execution unit. The exemplary microprocessor 700 uses three execution units, corresponding to a fixed point unit FXU 740, a load/store unit LSU 750, and a vector/scalar unit VSU 760. An exemplary vector scalar unit 760 includes four compute data paths denoted FMA0, FMA1, FMA2, and FMA3.

In one embodiment, VSU 760 executes scalar instructions corresponding to the Floating Point Processor in accordance with the Power Architecture™ specification and operating on 64 b data, and vector instructions in accordance with the vector media extensions in accordance with the Power Architecture™ specification and operating on 128 b data.

One or more execution units are operatively coupled to a register file. In the exemplary embodiment, FXU 740 and LSU 750 are operatively coupled to general-purpose register file 720, and LSU 750 and VSU 760 are operatively coupled to scalar and vector register file 730. LSU 750 is operatively coupled to the memory hierarchy (not shown).

Responsive to fetching a fixed point instruction, the instruction unit 710 decodes and issues the instruction to FXU 740.

Responsive to instruction issue for at least one instruction, the microprocessor initiates operand access for one or more register operands from general purpose register file 720, executes the instruction in FXU 740 and writes back a result to general purpose register file 720.

Referring now to the execution of fixed point load instructions, responsive to fetching a fixed point load instruction, the instruction unit 710 decodes and issues the instruction to LSU 740.

Responsive to instruction issue for at least one fixed point load instruction, the microprocessor 700 initiates operand access for one or more register operands from general purpose register file 720 to compute a memory address, fetches data corresponding to the memory address and writes back a result to general purpose register file to general purpose register file 720.

Referring now to the execution of fixed point store instructions, responsive to fetching a fixed point store instruction, the IU 710 decodes and issues the instruction to LSU 740.

Responsive to instruction issue for at least one fixed point store instruction, the microprocessor initiates operand access for at least one register operand from general purpose register file 720 to compute a memory address, and one store data operand from general purpose register file 720 corresponding to a datum to be stored in memory, and stores the datum in memory corresponding to the computed address.

Referring now to the execution of SIMD vector media extension instructions (corresponding to instructions operating on wide data), responsive to fetching a SIMD instruction, the instruction unit 710 decodes and issues the instruction to VSU 760.

Responsive to the instruction issue for at least one SIMD instruction, the microprocessor 700 may use, for example, the method 600 of FIG. 6 to control execution of the SIMD instruction, including but not limited to, initiating operand access for at least one vector register operand (corresponding to a wide data operand) from scalar and vector register file 730 in accordance with an embodiment of the present principles. In accordance with one embodiment, different storage bits are selected in a multi-bit cell corresponding to a specific thread set.

The method uses FMA0, FMA1, FMA2 and FMA3 to generate a wide result, and writes back the result to scalar and vector register file 730.

Referring now to the execution of scalar floating point vector media extension instructions (corresponding to instructions operating on narrow data), responsive to fetching a SIMD instruction, the instruction unit 710 decodes and issues the instruction to VSU 760.

Responsive to the instruction issue for at least one floating-point instruction, the microprocessor uses method 600 of FIG. 6 to control execution of the scalar instruction, including but not limited to, initiating operand access for at least one scalar register operand (corresponding to a narrow data operand) from scalar and vector register file 730 in accordance with the present invention. The microprocessor uses method 600 to determine which slice to use for executing scalar instructions based on the thread set.

In accordance with one embodiment, instructions read and write-update additional state, such as a floating point status and control register (FPSCR). In accordance with an embodiment, the FPSCR state (or other state) corresponding to at least one thread is maintained in conjunction with a first computation data path of FMA0, FMA1, FMA2, FMA3, and the FPSCR state (or other state) corresponding to at least one other thread is maintained in conjunction with a second distinct computation data path FMA0-FMA3.

In accordance with one embodiment, when an instruction operating on narrow width data a narrow width (e.g., scalar data) is issued to one data path, inactive data paths are de-energized, e.g., by using clock gating, power gating or other known or future de-energizing methods.

In accordance with another embodiment, when an instruction operating on narrow width data a narrow width (e.g., scalar data) is issued to one data path corresponding to one THREAD SET WHATEVER, another instruction operating on narrow width data a narrow width (e.g., scalar data) and corresponding to another THREAD SET WHATEVER corresponding to execution on another data path is issued to said another data path.

Referring now to the execution of wide data load instructions (e.g., SIMD instructions), responsive to fetching a SIMD load instruction, the instruction unit 710 decodes and issues the instruction to LSU 750.

Responsive to instruction issue for at least one SIMD load instruction, the microprocessor initiates operand access for at least one register operand (e.g., including but not limited to, from general purpose register file 720) to compute a memory address, fetches wide data corresponding to said memory address and writes back a wide data result to a wide register in scalar and vector register file. In a preferred embodiment, a bit cell is selected in a multi-bit cell based on a thread set.

Referring now to the execution of wide data store instructions (e.g. SIMD store instructions), responsive to fetching a SIMD store instruction, the instruction unit 710 decodes and issues the instruction to LSU 750.

Responsive to instruction issue for at least one SIMD store instruction, the microprocessor initiates operand access for at least one register operand (e.g., including but not limited to, from general purpose register file 720) to compute a memory address, and one wide store data operand from a scalar and vector register file 730 corresponding to a wide datum to be stored in memory, and stores said datum in memory corresponding to said computed address.

Referring now to the execution of narrow data load instructions (e.g., scalar FP instructions), responsive to fetching a scalar FP load instruction, the instruction unit 710 decodes and issues the instruction to LSU 750.

Responsive to instruction issue for at least one scalar FP load instruction, the microprocessor initiates operand access for at least one register operand (e.g., including but not limited to, from general purpose register file 720) to compute a memory address, fetches narrow data corresponding to said memory address. The LSU 750 then drives a portion of the data bus corresponding to the slice corresponding to the thread set of the instruction to write said loaded narrow data to the slice storing narrow data for the thread set of the instruction, by selecting a bit cell corresponding to the storage of narrow data in a multi-bit cell.

Referring now to the execution of narrow data store instructions (e.g., scalar FP load instructions), responsive to fetching a scalar FP store instruction, the instruction unit 710 decodes and issues the instruction to LSU 750.

Responsive to instruction issue for at least one SIMD store instruction, the microprocessor initiates operand access for at least one register operand (e.g., including but not limited to, from general purpose register file 720) to compute a memory address, and one narrow store data operand from a scalar and vector register file 730 corresponding to a narrow datum to be stored in memory, by selecting a storage bit corresponding to the storage of narrow data in a multi-bit cell, from a slice corresponding to the thread set corresponding to the scalar FP store instruction being executed. The LSU 750 further performs a selection (e.g., using a multiplexer 755) to select the source of the store datum from a portion of the data bus between LSU and scalar and vector register file corresponding to the slice corresponding to the thread set corresponding to the current instruction.

The LSU 750 stores the selected datum in memory corresponding to the computed address.

Those skilled in the art will understand that while the present invention has been described in terms of an architecture having distinct general purpose and scalar/vector register files, the present invention can be applied to microprocessors storing general purpose registers within a scalar and vector register file by selecting operands for fixed point compute, load and store instructions in accordance with method 600 of FIG. 6.

In one embodiment, when a scalar instruction from a first thread set is issued to a slice, a second scalar instruction associated with another thread set can be issued. In one embodiment, when a scalar instruction executes in the data path, unused slices will be de-energized. Alternatively, a single vector instruction can be issued to all slices.

It is to be appreciated that the present principles are not limited to the exact details of the preceding embodiment and, thus, threads can be used in place of or in addition to thread sets, more or less threads can be used or more or less thread sets than those described, while maintaining the spirit of the present principles.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A multi-bit storage cell for a register file, comprising:
   a first set of storage elements for a vector slice, each of the storage elements in the first set respectively corresponding to a particular one of a plurality of thread sets for the vector slice;

a second set of storage elements for a scalar slice, each of the storage elements in the second set respectively corresponding to a particular one of at least one thread set for the scalar slice; and at least one selection circuit, connected to said first set and said second set of storage elements, for selecting, for a given instruction issued by a given thread, a particular one of the storage elements from any of said first set and said second set of storage elements based upon the given instruction being a vector instruction or a scalar instruction and based upon a corresponding set from among the pluralities of thread sets to which the given thread belongs.

2. The multi-bit storage cell of claim 1, further comprising a plurality of port sets, operatively coupled to at least one of the plurality of selection circuits, for enabling at least one of reading and writing with respect to the vector data and the scalar data.

3. A register file with multi-bit storage cells for storing wide data and narrow data, the register file comprising:

a first multi-bit storage cell having wide bit cells for storing a portion of the wide data for each of a plurality of thread sets, and having at least one narrow bit cell separate from the wide bit cells for storing a portion of the narrow data corresponding to at least one of the plurality of thread sets; and a second multi-bit storage cell having wide bit cells for storing another portion of the wide data for each of the plurality of thread sets, and having at least one narrow bit cell separate from the wide bit cells for storing the portion of the narrow data stored by said first storage cell but corresponding to at least one other one of the plurality of thread sets, wherein each of the plurality of thread sets includes one or more member threads.

4. The register file of claim 3, further comprising:

a first data path connected to said first multi-bit storage cell; and a second data path connected to said second multi-bit storage cell, wherein at least said first data path and said second data path are used to operate on the wide data in parallel, wherein said first data path is used to operate on the narrow data stored in said first storage cell, and wherein said second data path is used to operate on the narrow data stored in said second storage cell.

5. The register file of claim 4, wherein the first data path is operatively coupled to additional state associated with an execution of the narrow data from the at least one of the plurality of thread sets, and wherein said second data path is operatively coupled to additional state associated with an execution of the narrow data from the at least one other one of the plurality of thread sets.

6. The register file of claim 4, wherein state information is provided to said first data path in response to executing a narrow data instruction from the at least one of the plurality of thread sets on said first data path.

7. The register file of claim 4, wherein state information is provided to said second data path in response to executing a narrow data instruction from the at least one other one of the plurality of thread sets on said second data path.

8. The register file of claim 3, wherein the wide data is vector data and the narrow data is scalar data.

9. The register file of claim 8, wherein each of the wide data includes at least twice as many bits as each of the narrow data.

10. A microprocessor adapted to the execution of instructions operating on narrow data and wide data and corresponding to a plurality of thread sets, comprising:

at least one first multi-bit storage element having a plurality of bit cells, at least two of the plurality of bit cells for storing a portion of the wide data for each of the plurality of thread sets, and at least one of the plurality of bit cells for storing a portion of the narrow data corresponding to at least one of the plurality of thread sets;

at least one second multi-bit storage element having a plurality of bit cells, at least two of the plurality of bit cells of the at least one second multi-bit storage element for storing another portion of the wide data for each of the plurality of thread sets, and at least one of the plurality of bit cells of the at least one second multi-bit storage element for storing a same portion of the narrow data for at least another one of the plurality of thread sets as that stored by the at least one of the plurality of bit cells of the at least one first multi-bit storage element; and a plurality of data paths corresponding to data slices adapted to operate on the wide data to generate a wide data result, and wherein a first subset of the plurality of data paths operate on the narrow data corresponding to a first one of the plurality of thread sets, and a second subset of the plurality of data paths operate on the narrow data corresponding to a second one of the plurality of thread sets, wherein each of the plurality of thread sets includes one or more member threads.

11. The microprocessor of claim 10, wherein the first subset of the plurality of data paths comprises a single data path.

12. The microprocessor of claim 10, further comprising logic for determining whether a current instruction is a wide data type instruction for operating on the wide data and accessing said at least one first multi-bit storage element and said at least one second multi-bit storage element, whether the current instruction is a narrow data type instruction for operating on the narrow data, and whether the current instruction will access said at least one first multi-bit storage element or said at least one second multi-bit storage element when the current instruction is the narrow data type instruction.

13. The microprocessor of claim 12, wherein said logic selects from a first storage bit and a second storage bit, in both of said at least one first multi-bit storage element and said at least one second multi-bit storage element, based on which of the plurality of thread sets to which the current instruction belongs.

14. The microprocessor of claim 12, further comprising logic for determining whether a current instruction is a narrow data type instruction operating on the narrow data and whether the current instruction will access a third bit of one of said at least one first multi-bit storage element or said at least one second multi-bit storage element, based on which of the plurality of thread sets to which the current instruction belongs.

15. The microprocessor of claim 14, further comprising logic for determining, for the current instruction, whether said at least one first multi-bit storage cell or said at least one second multi-bit storage cell is to be accessed, based on which of the plurality of thread sets to which the current instruction belongs.

16. The microprocessor of claim 15, further comprising logic for determining a portion of the plurality of data paths used to compute a narrow data result, and for issuing an instruction operating on the narrow data to the portion of the plurality of data paths.

17. The microprocessor of claim 16, wherein said logic de-energizes inactive ones of the plurality of data paths based on which of the plurality of thread sets to which an instruction being currently issued belongs.

18. The microprocessor of claim 10, further comprising logic for determining whether a current instruction is a wide data type instruction operating on the wide data and whether the current instruction will use all of the plurality of data paths to generate the wide data result.

19. The microprocessor of claim 10, further comprising a load and store unit for loading a wide datum and writing the wide datum to one of a first and a second storage bit of said at least one first and said at least one second multi-bit storage elements, the one of the first and the second storage bit in both of said at least one first and said at least one second multi-bit storage elements corresponding to a particular one of the plurality of thread sets corresponding to a current instruction, and loading a narrow datum and writing the narrow datum to a third storage bit of said at least one first multi-bit storage element or said at least one second multi-bit storage element when the current instruction corresponds to a specific one of the plurality of thread sets corresponding to the storage of the narrow data in said at least one first multi-bit storage element or said at least one second multi-bit storage element, respectively.

20. The microprocessor of claim 10, comprising a load and store unit for performing a read-access of a wide datum from one of the first and the second storage bit, the one of the first and second storage bit in both of said at least one first and said at least one second multi-bit storage elements corresponding to the current instruction, for performing a read-access of the narrow datum from the third storage bit and involving said at least one first multi-bit storage element when the current instruction corresponds to the at least one of the plurality of thread sets corresponding to the storage of the narrow data in said at least one first multi-bit storage element, and for performing a read-access of the narrow datum from the third storage bit and involving said at least one second multi-bit storage element when the current instruction corresponds to the at least one of the plurality of thread sets corresponding to the storage of the narrow data in said at least one second multi-bit storage element.

* * * * *